US012786252B2

(12) United States Patent
Joul et al.

(10) Patent No.: US 12,786,252 B2
(45) Date of Patent: Nov. 3, 2026

(54) SERVICE-BASED INTERNET PROTOCOL MULTIMEDIA SUBSYSTEM (IMS) ARCHITECTURE

(71) Applicant: T-Mobile USA, Inc., Bellevue, WA (US)

(72) Inventors: Christopher Harvey Joul, Bellevue, WA (US); Shujaur Rehman Mufti, Snoqualmie, WA (US); Saqib Badar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 198 days.

(21) Appl. No.: 18/852,370

(22) PCT Filed: Mar. 28, 2023

(86) PCT No.: PCT/US2023/016584
§ 371 (c)(1),
(2) Date: Sep. 27, 2024

(87) PCT Pub. No.: WO2023/192292
PCT Pub. Date: Oct. 5, 2023

(65) Prior Publication Data

US 2025/0184376 A1 Jun. 5, 2025

Related U.S. Application Data

(60) Provisional application No. 63/324,547, filed on Mar. 28, 2022.

(51) Int. Cl.
*H04L 65/1073* (2022.01)
*H04L 65/1016* (2022.01)

(52) U.S. Cl.
CPC ...... *H04L 65/1073* (2013.01); *H04L 65/1016* (2013.01)

(58) Field of Classification Search
CPC .. H04L 65/1016; H04L 65/1073; H04L 69/24
See application file for complete search history.

(56) References Cited

U.S. PATENT DOCUMENTS 8,660,554 B2 * 2/2014 Sharp .................. H04L 65/1016 455/433
2011/0292839 A1 * 12/2011 Swaminathan ......... H04L 65/80 370/259

(Continued)

FOREIGN PATENT DOCUMENTS

WO 2021/018460 A1 2/2021
WO 2021064445 A1 4/2021
WO 2021158149 A1 8/2021

OTHER PUBLICATIONS

China Mobile TR 23.700-87: KI on service based architecture for IMS media control 3GPP TSG SA WG2 #149E S2-2200126, Jan. 28, 2022, 2 pages.

(Continued)

*Primary Examiner* — Amy R Hsu
(74) *Attorney, Agent, or Firm* — Ashurst Perkins Coie US LLP

(57) ABSTRACT

Systems and methods for extending the Service Based Architecture to Internet Protocol (IP) Multimedia Subsystem (IMS) are disclosed. In one example aspect, a wireless communication method includes transmitting, by a network node in the IMS, a registration request to a Network Function Repository Function (NRF) via a first service-based network interface. The registration request includes capability information of the network node indicating support for one or more services.

18 Claims, 12 Drawing Sheets

(56) References Cited

U.S. PATENT DOCUMENTS

| | | | | |
|---|---|---|---|---|
| 2021/0058435 | A1* | 2/2021 | Sharma | H04L 69/321 |
| 2021/0266349 | A1* | 8/2021 | Foti | H04L 65/1104 |
| 2021/0410057 | A1* | 12/2021 | Abtin | H04L 41/5051 |
| 2023/0055658 | A1* | 2/2023 | Yao | H04L 67/14 |
| 2025/0088545 | A1* | 3/2025 | Shahdad | H04L 65/1016 |

OTHER PUBLICATIONS

Office Action received for Japanese Patent Application No. 2024-557719, mailed on Aug. 26, 2025, 6 pages with English translation.

T-Mobile USA New Solution for new key issue IMS MRF Discovery and Selection using 5G-SBA NRF 3GPP TSG SA WG2 #150E S-22202264, Mar. 29, 2022, 5 pages.

Chairman et al., "Proposed allocation of documents to agenda items for CT4#103E: Notes final", 3GPP Draft; Notes-Final_C4-212004_CT4#103E DAD, 3rd generation partnership project(3GPP), vol. CT WG4, No. E-Meeting, Apr. 14, 20212-Apr. 23, 2021, Apr. 27, 2021.

Ericsson et al., "IMS Optimization for HSS Group ID in an SBA environment", 3GPP Draft, S2-2001837, 3rd Generation Partnership Project (3GPP), vol. SA WG2, No. Feb. 24, 2020-Feb. 28, 2020, Feb. 18, 2020.

Extended European Search Report received for European Application No. 23781697, mailed on Feb. 19, 2026, 13 pages.

International Searching Authority, International Search Report and Written Opinion, PCT Patent Application PCT/US2023/016584, mailed Jul. 14, 2023, 9 pages.

* cited by examiner

300

400

800

SERVICE-BASED INTERNET PROTOCOL MULTIMEDIA SUBSYSTEM (IMS) ARCHITECTURE

CROSS-REFERENCE TO RELATED APPLICATIONS

This application is an International Patent application claiming the benefit of U.S. Patent Application No. 63/324,547, filed on Mar. 28, 2022, entitled SERVICE-BASED INTERNET PROTOCOL MULTIMEDIA SUBSYSTEM (IMS) ARCHITECTURE, which is hereby incorporated by reference in its entirety.

BACKGROUND

Mobile communication technologies are moving the world toward an increasingly connected and networked society. The Fifth-Generation (5G) New Radio (NR) architecture is based on a Service-Based Architecture (SBA), an architectural approach that enables 5G network functionality to become more granular and decoupled. SBA allows individual services to be updated independently with minimal impact to other services, thereby providing vendor independence, reduction in deployment time, and enhanced operational efficiencies.

Figure 1:
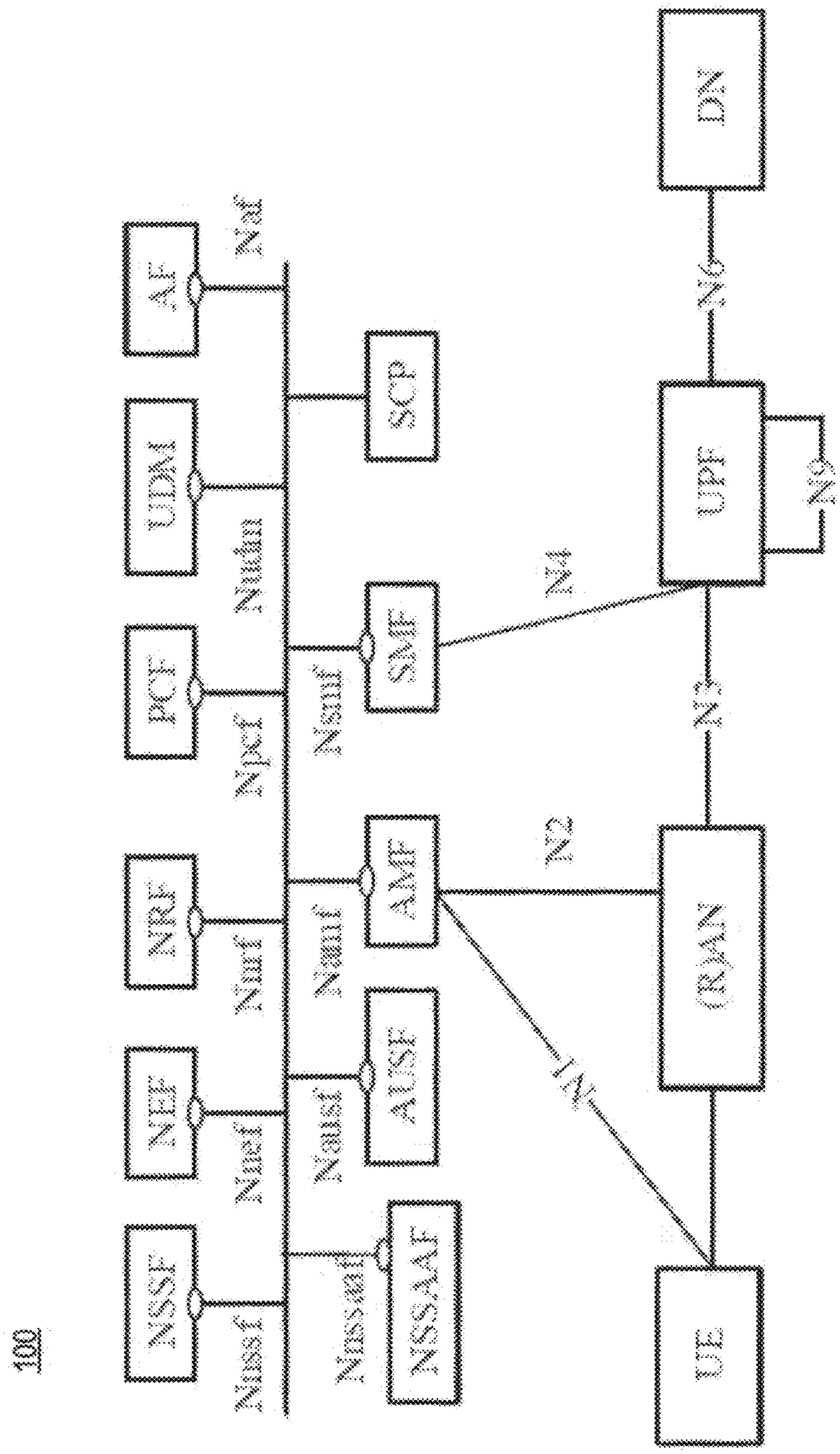
FIG. 1 illustrates an example 5G reference architecture in which service-based interfaces are used within the control plane.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

Systems, methods, and devices for extending the Service Based Architecture to Internet Protocol (IP) Multimedia Subsystem (IMS) are disclosed so as to enable the discovery and selection of IMS nodes using a uniform interface and mechanism as non-IMS functions in the 5G network, thereby reducing complexity in signaling, monitoring, and deployment of the network elements.

The 5G Service Based Architecture was introduced in Release 15 of the Third-Generation Partnership Project (3GPP) standard. FIG. 1 illustrates an example 5G reference architecture 100 in which service-based interfaces are used within the control plane. The Network Function Repository Function (NRF) is a key element of the Service Based Architecture. The NRF is the logical function that is used to support the functionality of Network Function (NF) and NF service discovery. The NRF provides a single record of network functions (NF) available in a given Public Land Mobile Network (PLMN), along with NF capabilities indicating the services they support. The capabilities are then used when NF selection is performed.

Figure 2:
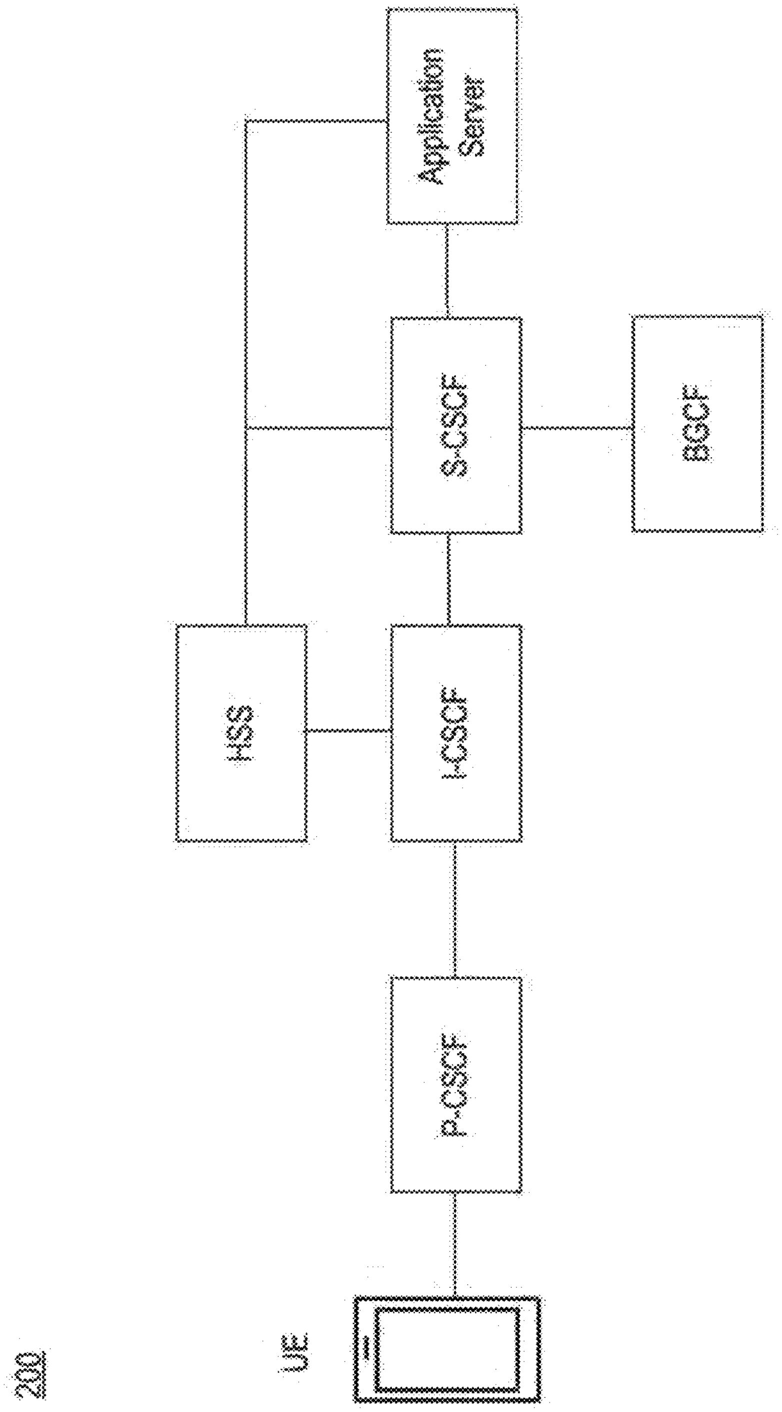
FIG. 2 illustrates an example Internet Protocol (IP) Multimedia Subsystem (IMS) architecture.

In cellular networks, the Internet Protocol (IP) Multimedia Subsystem (IMS) is an architectural framework for delivering IP multimedia services. The IMS uses the Internet Engineering Task Force (IETF) protocols, e.g., the Session Initiation Protocol (SIP), for signaling transmissions. FIG. 2 illustrates an example IMS architecture 200. Several roles of SIP servers or proxies, collectively called Call Session Control Function (CSCF), are used to process SIP signaling packets in the IMS. A Proxy-CSCF (P-CSCF) is a SIP proxy that is the first point of contact for the IMS terminal. An Interrogating-CSCF (I-CSCF) is another SIP function located at the edge of an administrative domain with its IP address published in the Domain Name System (DNS) so that remote servers can find it and use it as a forwarding point for SIP packets. A Serving-CSCF (S-CSCF) is the central node of the signaling plane. Conventionally, the S-CSCF uses Diameter Cx and Dx interfaces to the Home Subscriber Sever (HSS) to download user profiles and upload user associations.

For backward compatibility for earlier deployments of the IMS and 5GC functions, the 5G System architecture supports N5 interface and the Rx interface between the Policy Control Function (PCF) and P-CSCF to enable IMS service. In Release 16 of the 3GPP standard, the IMS was enhanced to utilize some service-based interfaces (e.g., toward P-CSCF, PCF, and/or HSS). Currently, P-CSCF selection functionality can be used by the Session Management Function (SMF) to select the P-CSCF for an IMS Protocol Data Unit (PDU) Session of the User Equipment (UE). The SMF can utilize the NRF to discover the P-CSCF. However, other IMS elements, such as I/S-CSCF, Telephony Application Sever (TAS), Rich Communication Service (RCS), Breakout Gateway Control Function (BGCF), and/or Interconnect Border Control Function (IBCF) etc., utilize the IMS Domain Name Server (DNS) to resolve the next hop address.

Figure 3:
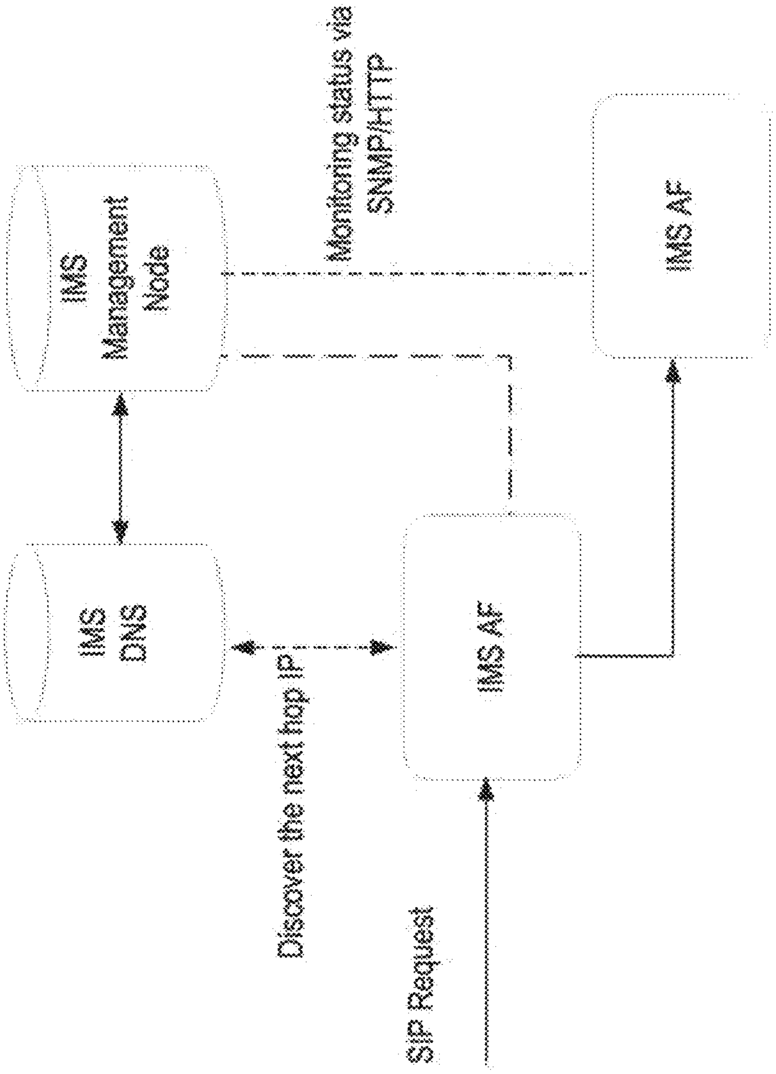
FIG. 3 (Prior Art)
FIG. 3 illustrates an example architecture for IMS Application Function (AF) discovery via Domain Name Server (DNS).

FIG. 3 illustrates an example architecture 300 for IMS Application Function (AF) discovery via DNS. In this architecture, the DNS provides discovery and regional selection via service-based load sharing. In particular, an IMS management node monitors IMS nodes via Simple Network Management Protocol (SNMP) or Hyper Text Transfer Protocol (HTTP) to remove node(s) from selection if the node(s) handles a large load of traffic in the region or is down for maintenance. Discovery and selection of an IMS node utilize pre-configuration or DNS to determine which node is right for the services being used by the IMS user. For example, to select an IMS Media Resource Function (MRF) specialized for video codec adaptation, the IMS video Application Server (AS) needs to be configured with a list of Fully Qualified Domain Names (FQDNs) associated with the pool of MRFs that can perform the video codec adaptation.

Figure 4:
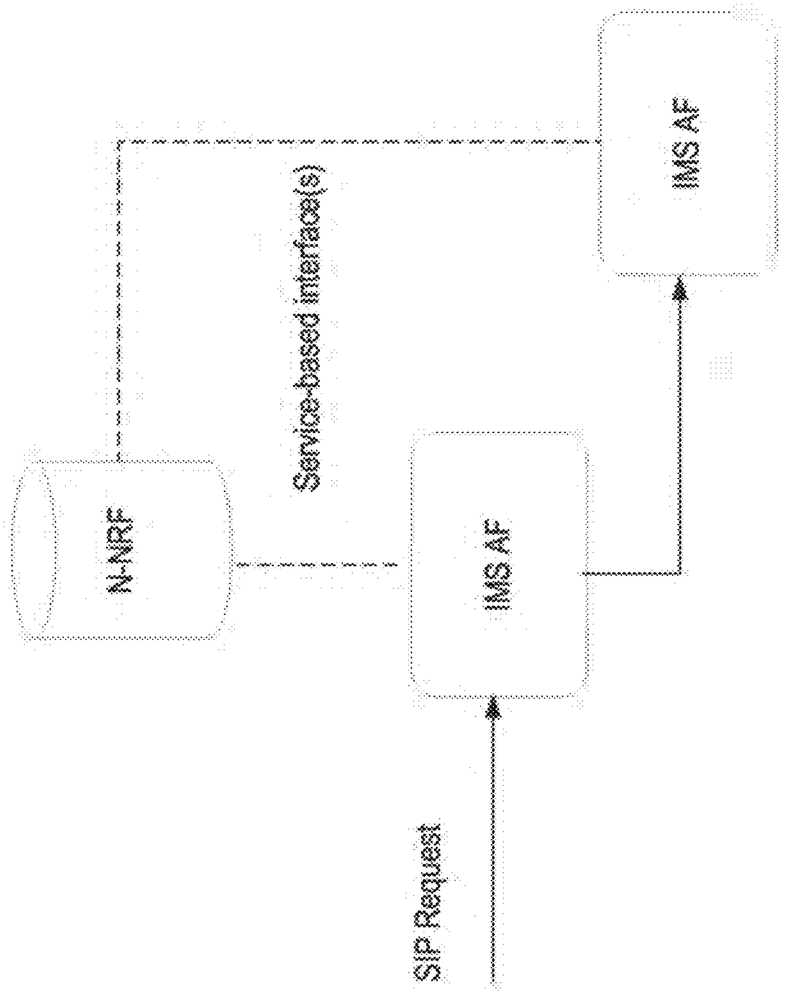
FIG. 4 illustrates an example architecture of Service Based Architecture IMS in accordance with one or more embodiments of the present technology.

DNS based discovery and selection process as shown in FIG. 3 is not aligned with the 5G Service Based Architecture. Furthermore, point-to-point interfaces between the IMS elements (e.g., the IMS management node and the AFs) also bring complexity and signaling overhead. This patent document discloses techniques that can be implemented in various embodiments to extend the Service Based Architecture to IMS so as to enable the discovery and selection of IMS AFs using a uniform interface and mechanism as non-IMS AFs. FIG. 4 illustrates an example architecture 400 of Service Based Architecture IMS in accordance with one or more embodiments of the present technology. As shown in FIG. 4, the N-NRF can replace the functionality of the IMS DNS and/or IMS management node for the discovery, selection, and/or monitoring of IMS node(s) via serviced based interfaces. In some embodiments, the NRF can be adapted to support IMS node(s) discovery and/or selection. The NRF can support IMS node registration and support IMS node subscription to obtain node information (e.g., traffic load). In some embodiments, additional information such as the network function type and/or extensions for service capabilities can be included in the IMS node registration process. The NF discovery service can be adapted to support IMS Application Server discovery/selection (e.g., based on the capabilities of the IMS nodes). In some embodiments, one or more new interfaces that are consistent with the existing SBA can be added to support the subscription and notification of the node status (e.g., service load). Within the IMS, the IMS nodes can be adapted accordingly to support the Service Based Architecture. The IMS nodes can register with the NRF to provide their capabilities for supporting various services and to provide node information to the NRF.

Figure 5:
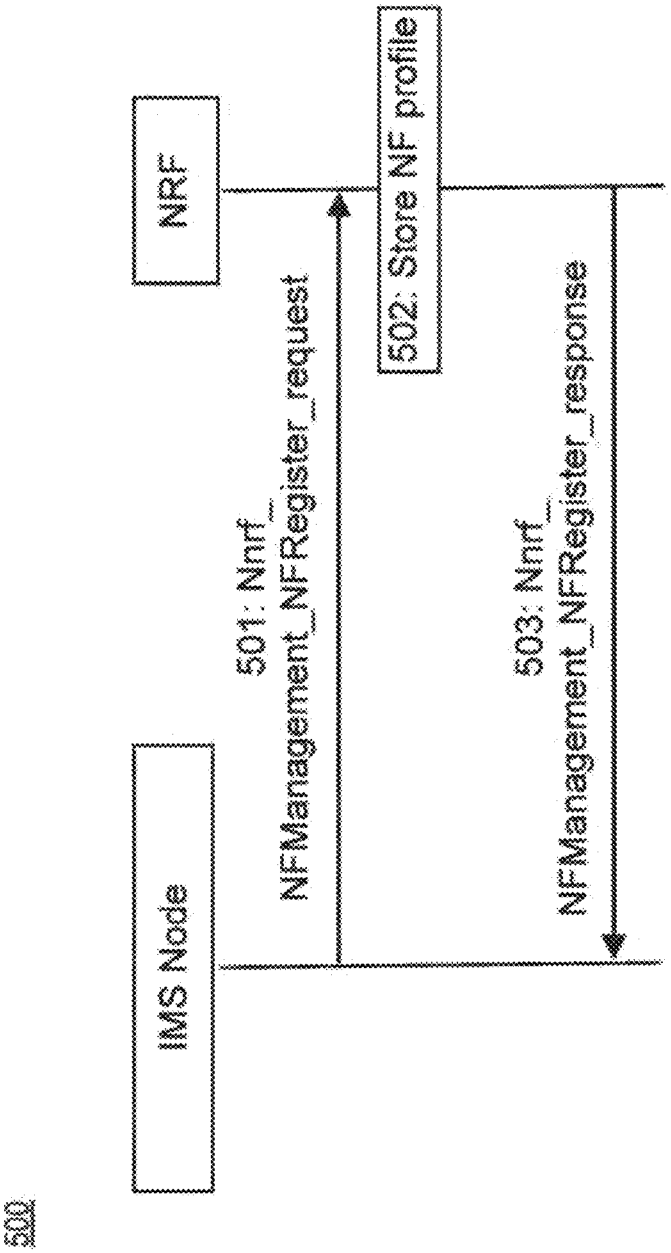
FIG. 5 illustrates an example sequence flow for an IMS node registration procedure in accordance with one or more embodiments of the present technology.

FIG. 5 illustrates an example sequence flow 500 for an IMS node registration procedure in accordance with one or more embodiments of the present technology. On initialization, an IMS node performs a NF registration procedure with the NRF. As shown in FIG. 5, at operation 501, the IMS node sends a request message (e.g., Nnrf_NFManagement_NFRegister Request message) to inform the NRF of its profile when the IMS node becomes operative for the first time. The profile includes the one or more services supported by this node. In some embodiments, the profile can include an alphanumeric sequence (e.g., a wildcard string) to indicate support of all services in a particular category. In addition to the indication of the capabilities, the IMS node can also include other types of parameters, such as its location, priority, etc. into the profile. Other parameters that can be carried in the profile include, but are not limited to, the IP address, the IMS region, the International Mobile Subscriber Identity (IMSI) Range, the Mobile Country Codes (MCCs) and/or Mobile Network Codes (MNCs) of the supported PLMN networks (MCC/MNC), and/or supported 5G slices. At operation 502, the NRF stores the profile of the IMS node and marks it as available. At operation 503, the NRF acknowledge the IMS node registration via a response message (e.g., Nnrf_NFManagement_NFRegister Response message). In some embodiments, in distributed MRF implementations where the MRF Controller (MRFC) and the MRF Processor (MRFP) are deployed in a distributed matter, the MRFC and/or MRFP can follow the registration process consistent with the flow shown in FIG. 5. In some embodiments, only one of MRFC or MRFP needs to register if the pairing is known or pre-configured.

After successful registration, the IMS node can send updates to NRF to communicate changes in its profile. The updates can be transmitted periodically or be triggered by preconfigured/predefined events. The updates are used to communicate changes in status or capabilities for the network to better handle the offered traffic to the IMS node. For example, the network can adapt and adjust the load of IMS nodes upon detecting that selected IMS nodes are heavily loaded or lightly loaded.

Figure 6:
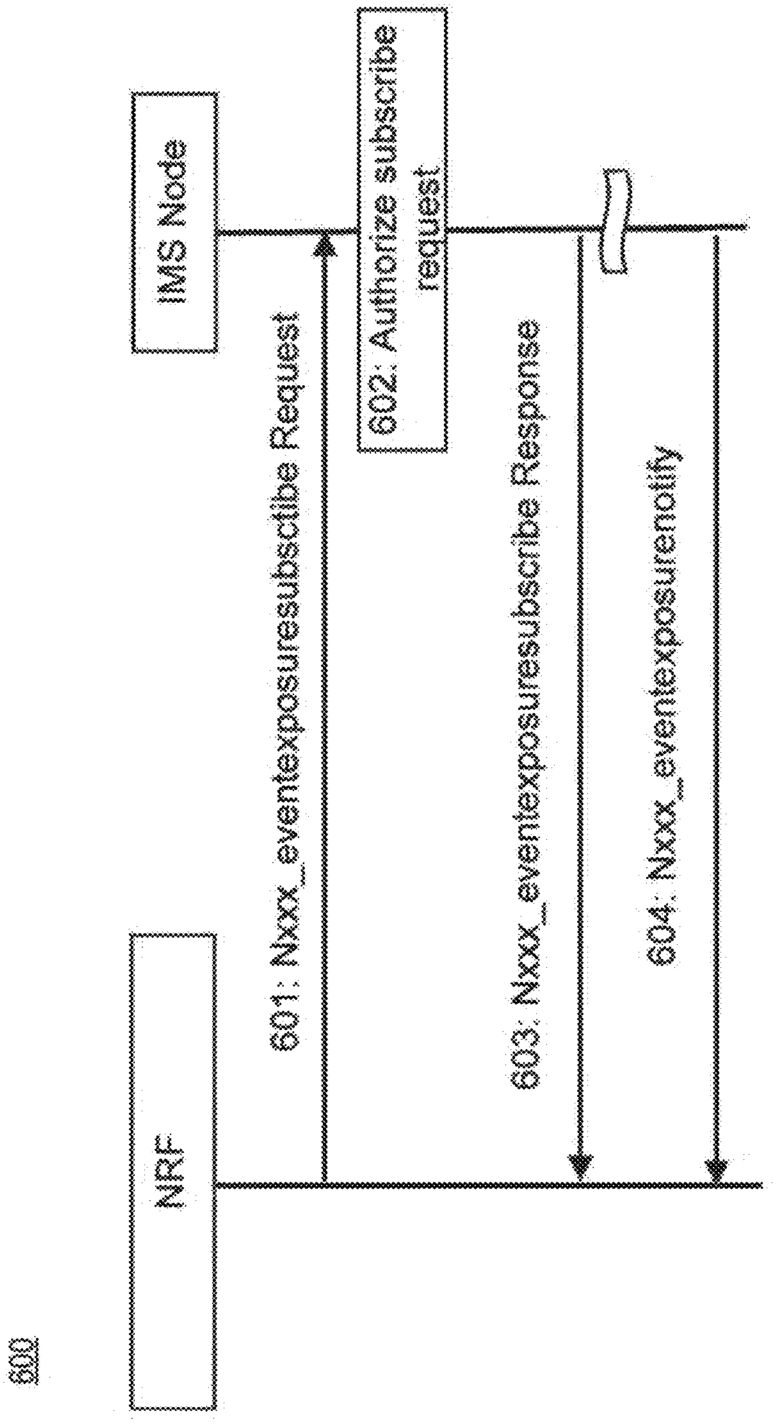
FIG. 6 illustrates an example sequence flow for a Network Function Repository Function (NRF) subscription procedure in accordance with one or more embodiments of the present technology.

In some embodiments, the NRF can optionally subscribe to the IMS node for information regarding the node (e.g., the load status of the IMS node). FIG. 6 illustrates an example sequence flow 600 for an NRF subscription procedure in accordance with one or more embodiments of the present technology. At operation 601: the NRF sends a subscription request (e.g., Nxxx_eventexposuresubscribe request) to the IMS node so that it can be notified of IMS node's status changes (e.g., load changes). At operation 602, the IMS node authorizes the NRF request. At operation 603, the IMS node sends a response message (e.g., Nxxx_eventexposuresubscribe response) indicating that the request has successfully been accepted. At operation 604, the IMS node notifies the subscribed NRFs (e.g., using the Nxxx_eventexposurenotify service) when there is a change in its status (e.g., traffic load). For example, the load status of an IMS node can include the processor load, media channels, or data throughput. The IMS node can notify the NRF when it detects that its load exceeds one or more specific thresholds (e.g., 90%). The interface between the NRF and the IMS node for subscriptions/notification can be named according to the type(s) of services that the IMS node supports. For example, for IMS Media Resource Function (MRF) node, a new interface Nmrf can be added to provide subscription and even notification signaling.

Figure 7:
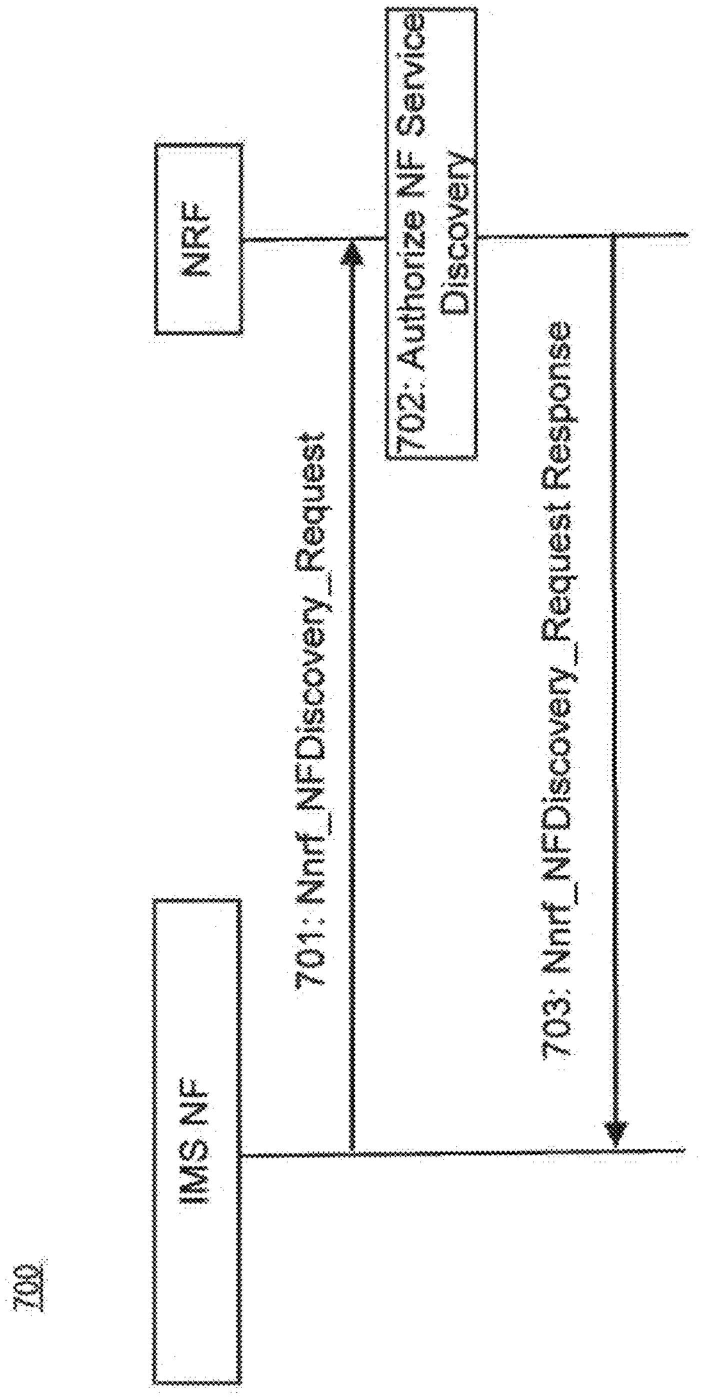
FIG. 7 illustrates an example sequence flow for an IMS node discovery and selection procedure in accordance with one or more embodiments of the present technology.

When an IMS Application Server requires a corresponding IMS node to perform operations for a particular service, the IMS AS requests service discovery/selection by the NRF. FIG. 7 illustrates an example sequence flow 700 for an IMS node discovery and selection procedure in accordance with one or more embodiments of the present technology. At operation 701, the IMS NF (e.g., CSCF, AS, etc.) invokes a discovery of the IMS node(s) by sending a request (e.g., Nnrf_NFDiscovery_Request) to the NFR. The request can include information about the one or more services supported by at least one IMS node. In some embodiments, the request can include a wildcard string indicating all services in a particular category. At operation 702, the NRF authorizes the discovery request according to the 5G SBA practices. At operation 703, the NRF determines one or more IMS nodes that match the services indicated by the request and internal policies. The NRF then sends information about the one or more IMS nodes to the IMS NF via a response message (e.g., Nnrf_NFDiscovery_Request Response). In some embodiments, in distributed MRF implementations where the MRFC and MRFP are deployed in a distributed matter, the MRFC and/or MRFP can be discovered/selected consistent with the flow shown in FIG. 7.

For example, the discovery request can include the capabilities for the particular IMS service. In some embodiments, the NRF performs IMS node discovery and the IMS AS performs IMS node selection. The NRF can respond with a list of IMS nodes that can meet the required service capabilities, along with the other NRF parameters (e.g., location, priority, load, etc.). The IMS AS can select an appropriate IMS node based on properties and/or characteristics of the IMS nodes, such as IP addresses, IMS regions, Non-Public Network Identifiers, PLMN identifiers, roaming status, Visited PLMN address(es), UE International Mobile Equipment Identity (IMEI), UE IMSI, UE Mobile Station International Subscriber Directory Number (MSISDN), HSS Group ID, required identifier(s) for network slice or slices. In some embodiments, the NRF can perform both IMS node discovery and selection. The NRF can respond with a specific IMS node selected from a list of IMS nodes that satisfy the service requirements.

Depending on IMS AS implementation the AS can request each service individually, or a particular set together (e.g., a TAS supporting voice services can request all of the voice services the first time it needs a service for a particular user, or request each voice service individually when it needs to provide a particular service for a user).

One category of IMS services is media services (e.g., Media Resource Function, MRF). Examples of media services include, but are not limited to, at least one of: voice announcements, voice conferencing, voice codec adaptation, video codec adaptation, video conferencing, and so on. Other categories of IMS services include but are not limited to Text Messaging (including SMS interworking), Rich Communications Suite (RCS), end-to-end (or peer-to-peer) user data channels, IMS Gaming Services, IMS Alternate/Augmented Reality, Real-Time Text (RTT), and automated language translation services.

Figure 8A:
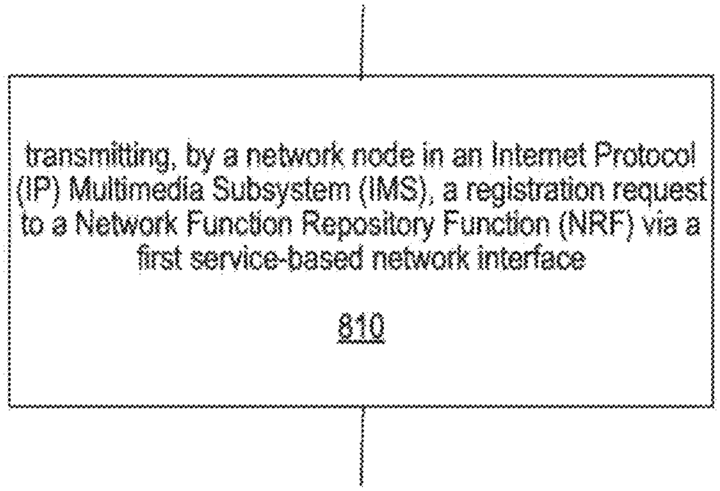
FIG. 8A is a flowchart representation of a method for wireless communication in accordance with one or more embodiments of the present technology.

FIG. 8A is a flowchart representation of a process 800 for wireless communication in accordance with one or more embodiments of the present technology. The process 800 includes, at operation 810, transmitting, by a network node in an Internet Protocol (IP) Multimedia Subsystem (IMS), a registration request to a Network Function Repository Function (NRF) via a first service-based network interface. The registration request includes capability information of the network node indicating support for one or more services. In some embodiments, the method includes receiving, by the network node, a subscription request from the NRF via a second service-based network interface, and notifying the NRF of information about a status of the network node via the second service-based network interface. In some embodiments, the information about the status of the network node comprises load information of the network node (e.g., processor load, network conditions, etc.). In some embodiments, the registration request comprises information indicating a network function type of the network node (e.g., media service/media function). In some embodiments, the first service-based network interface comprises an Nnrf interface.

Figure 8B:
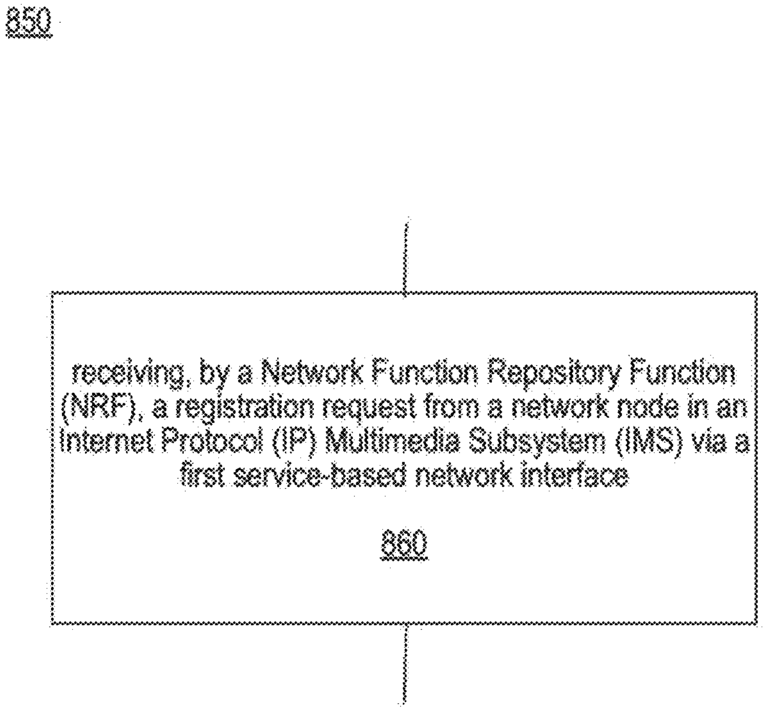
FIG. 8B is a flowchart representation of another method for wireless communication in accordance with one or more embodiments of the present technology.

FIG. 8B is a flowchart representation of a process 850 for wireless communication in accordance with one or more embodiments of the present technology. The process 850 includes, at operation 860, receiving, by a Network Function Repository Function (NRF), a registration request from a network node in an Internet Protocol (IP) Multimedia Subsystem (IMS) via a first service-based network interface. The registration request includes capability information of the network node indicating support for one or more services. In some embodiments, the method includes transmitting, by the NRF, a subscription request to the network node via a second service-based network interface and monitoring, by the NRF, a status of the network node in response to the subscription request. In some embodiments, the status of the network node comprises load information of the network node. In some embodiments, the registration request comprises information indicating a network function type of the network node. In some embodiments, the first service-based network interface comprises an Nnrf interface. In some embodiments, the method includes receiving, by the NRF, a service request from an application server of the IMS for a specified service and determining, by the NRF, one or more network nodes that support the specified service in response to the service request according to capability information of network nodes in the IMS.

Figure 9:
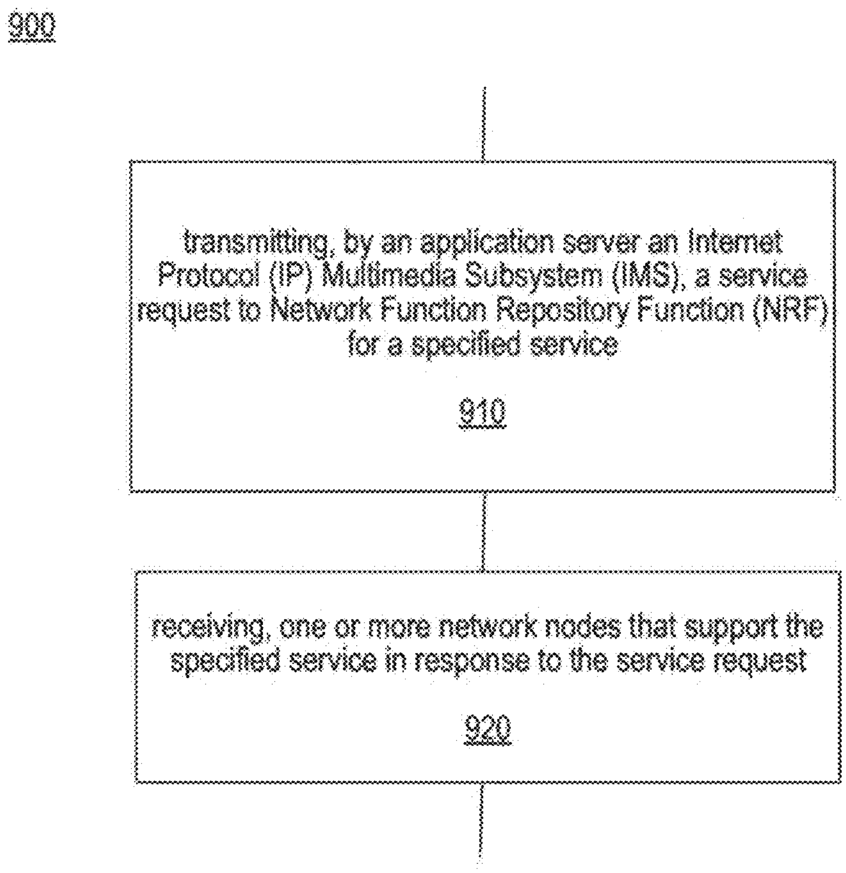
FIG. 9 is a flowchart representation of yet another for wireless communication in accordance with one or more embodiments of the present technology.

FIG. 9 is a flowchart representation of a process 900 for wireless communication in accordance with one or more embodiments of the present technology. The process 900 includes, at operation 910, transmitting, by an application server an Internet Protocol (IP) Multimedia Subsystem (IMS), a service request to Network Function Repository Function (NRF) for a specified service. The process 900 also includes, at operation 920, receiving, one or more network nodes that support the specified service in response to the service request. In some embodiments, the method includes selecting, by the application server, a network node from the one or more network nodes provided by the NRF.

For example, the network node comprises a Media Resource Function (MRF). The capability information indicates support for at least one of: a voice announcement service, a voice conferencing service, a voice codec adaptation service, a video codec adaptation service, a video conference service. The second service-based network interface can be named according to the service type (e.g., an Nmrf interface).

One example of changes that can be made to the 3GPP Technical Specification (TS) 23.228 is shown in Table 1 below.

TABLE 1

| Example Changes to TS 23.228 of the 3GPP Standard |
|---|
| AA.X SBI Discovery and Selection for IMS Media Functions |
| AA.X.1 NRF based IMS-MRF Discovery and Selection |
| AA.X.1.1 General |

TABLE 1-continued

| Example Changes to TS 23.228 of the 3GPP Standard |
|---|
| While no SBI procedures are defined for IMS-MRF (and hence IMS-MRFC and IMS-MRFP), it is possible to utilize NRF to discover and select the IMS-MRF to use for an application or service. In networks where IMS-MRFC and IMS-MRFC are co-located it is only necessary to indicate that the service function is IMS-MRF, in networks where discreet IMS-MRFC and IMS-MRFP are deployed it is necessary to indicate which service function is needed - in some cases IMS-MRF, IMS-MRFC, and IMS-MRFP indications may co-exist inside the same network. |
| When an SBI capable IMS entity selects a MRF it shall use the IMS Media service list to ensure that the selected IMS-MRF supports the required media capabilities for the application. The SBI capable IMS entity may utilize other available information to assist in selecting the MRF based on other implementation criteria (e.g. proximity of the IMS UE to MRF to minimize transmission delays). |
| An SBI capable IMS entity always selects an IMS-MRF (or IMS-MRFC or IMS-MRFP) within its own PLMN. |
| AA.X.1.2 IMS-MRF Registration |
| If an IMS-MRF has been configured to support NRF based discovery or selection it shall register with the NRF using the Nnrf_NFManagement_NFRegister Request message as defined in TS 23.502 [94]. The NF profile of the IMS-MRF registered in NRF includes necessary information for an SBI capable IMS entity interact with the IMS-MRF using non-SBI procedures. In addition, the NF profile for IMS-MRF includes a text-based list of IMS Media services performed by the IMS-MRF (e.g. video transcoding, voice conferencing, in-call announcements). |
| NOTE: The list of Media services is implementation specific and individual entries in the list need to be configured to exactly correspond to the discovery requests made by IMS-AS or other SBA entity. |
| The MRF registration may include other information pertaining to the implementation (e.g.NF location to support routing media to nearest MRF, MSISDN prefix, or IP address for IP based "least-cost" routing). |
| AA.X.1.3 IMS-MRF Discovery and Selection |
| During the IMS procedure, an SBI capable IMS entity sends a Nnrf_NFDiscovery_Request to NRF as defined in TS 23.502 [94] to discover applicable MRF instances within a given PLMN. The SBI capable entity may include a list of the service or services it is requesting to use, in which case the NRF will respond with the IMS-MRF (s) that support all the services listed. The SBI capable IMS entity may store all returned IMS-MRF instances and their NF profiles for subsequent use, including location and IP address (if supplied according to implementation). If the IMS Media services list is blank the NRF shall return all applicable IMS-MRF according to the other selection parameters included in the request. |
| NOTE: The SBI enabled IMS entity can also perform IMS-MRF discovery prior to receiving an IMS request without any including any applicable user, or IMS media service information in the request. |
| When separate IMS-MRFC and IMS-MRFP are used, and when there is no direct association between an IMS-MRFC and IMS-MRFP, then discovery and selection of the MRFP may be needed after the IMS-MRFC discovery; in such a case the IMS-MRFC may perform SBI discovery of the NRF IMS-MRFP, as if it were an IMS-AS. |
| AA.X.1.4 Enhanced IMS-MRF for Data Channel Services |
| To support IMS Data Channel services the Enhanced IMS-MRF is defined in clause XX, in regard to the registration, discovery, and selection described in this clause, the enhanced IMS-MRF is a type of service listed in the IMS Media services field. |

Another example of changes (in bold and underlined texts) that can be made to the 3GPP TS 23.502 is shown in Table 2 below.

TABLE 2

Example Changes to TS 23.502 of the 3GPP Standard 5.2.7.1 General

The following table shows the NRF Services and Service Operations:

1. Table 5.2.7.1-1: NF services provided by the NRF

| Service Name | Service Operations | Operation Semantics | Example Consumer(s) |
|---|---|---|---|
| Nnrf_NFManagement | NFRegister | Request/Response | AMF, SMF, UDM, AUSF, NEF, PCF, SMSF, NSSF, UPF, BSF, CHF, NWDAF, P-CSCF, HSS, UDR, SCP, 5G DDNMF, DCCF, NSACF, MB-SMF, AF (NOTE 2), TSCTSF, EASDF, MFAF, ADRF, IMS-MRF |
| | NFUpdate | Request/Response | AMF, SMF, UDM, AUSF, NEF, PCF, SMSF, NSSF, UPF, BSF, CHF, NWDAF, P-CSCF, HSS, UDR, SCP, 5G DDNMF, DCCF, NSACF, MB-SMF, TSCTSF, EASDF, MFAF, ADRF, IMS-MRF |

TABLE 2-continued

| Example Changes to TS 23.502 of the 3GPP Standard | | | |
|---|---|---|---|
| | NFDeregister | Request/Response | AMF, SMF, UDM, AUSF, NEF, PCF, SMSF, NSSF, UPF, BSF, CHF, NWDAF, P-CSCF, HSS, UDR, SCP, 5G DDNMF, DCCF, NSACF, MB-SMF, TSCTSF, EASDF, MFAF, ADRF, IMS-MRF |
| | NFStatusSubscribe | Subscribe/Notify | AMF, SMF, PCF, NEF, NSSF, SMSF, AUSF, CHF, NRF, NWDAF, I-CSCF, S-CSCF, IMS-AS, SCP, UDM, TSCTSF, DCCF |
| | NFStatusNotify | | AMF, SMF, PCF, NEF, NSSF, SMSF, AUSF, CHF, NWDAF, I-CSCF, S-CSCF, IMS-AS, SCP, UDM, TSCTSF, DCCF |
| | NFStatusUnSubscribe | | AMF, SMF, PCF, NEF, NSSF, SMSF, AUSF, CHF, NRF, NWDAF, I-CSCF, S-CSCF, IMS-AS, SCP, UDM, TSCTSF, DCCF |
| Nnrf_NFDiscovery | Request | Request/Response | AMF, SMF, PCF, NEF, NSSF, SMSF, AUSF, CHF, NRF, NWDAF, I-CSCF, S-CSCF, IMS-AS, SCP, UDM, AF (NOTE 2), DCCF, MBSF, 5G DDNMF, TSCTSF |
| Nnrf_AccessToken | Get | Request/Response | AMF, SMF, PCF, NEF, NSSF, SMSF, AUSF, UDM, NWDAF, I-CSCF, S-CSCF, IMS-AS, HSS, DCCF |
| Nnrf_Bootstrapping | Get | Request/Response | NRF, any NF or SCP |

NOTE 1: HSS_IMS services are defined in TS 23.228 [55].
NOTE 2: The AF is a trusted AF by an operator.
NOTE 3: IMS-MRF also includes IMS-MRFC and IMS-MRFP when IMS-MRF is realized with separate controller and media processor elements.

5.2.7.2.2 Nnrf_NFManagement_NFRegister service operation

Service Operation name: Nnrf_NFManagement_NFRegister.

...

- If the consumer is NEF, it includes the support for UAS NF functionality.
- If the consumer is IMS-MRF, it includes the list of supported IMS media services (as defined in TS 23.228 [55]).

5.2.7.3.2 Nnrf_NFDiscovery_Request service operation

Service operation name: Nnrf_NFDiscovery_Request

...

- If the target NF is DCCF, it includes DCCF serving area information, NF type of the NF data sources,
  NF Set ID of the NF data sources. Details about DCCF specific information are described in clause 6.3.19 of TS 23.501 [2].
- If the target is IMS-MRF, it includes the list of required IMS media services (as defined in TS 23.228 [55]).

Wireless Communications System

Figure 10:
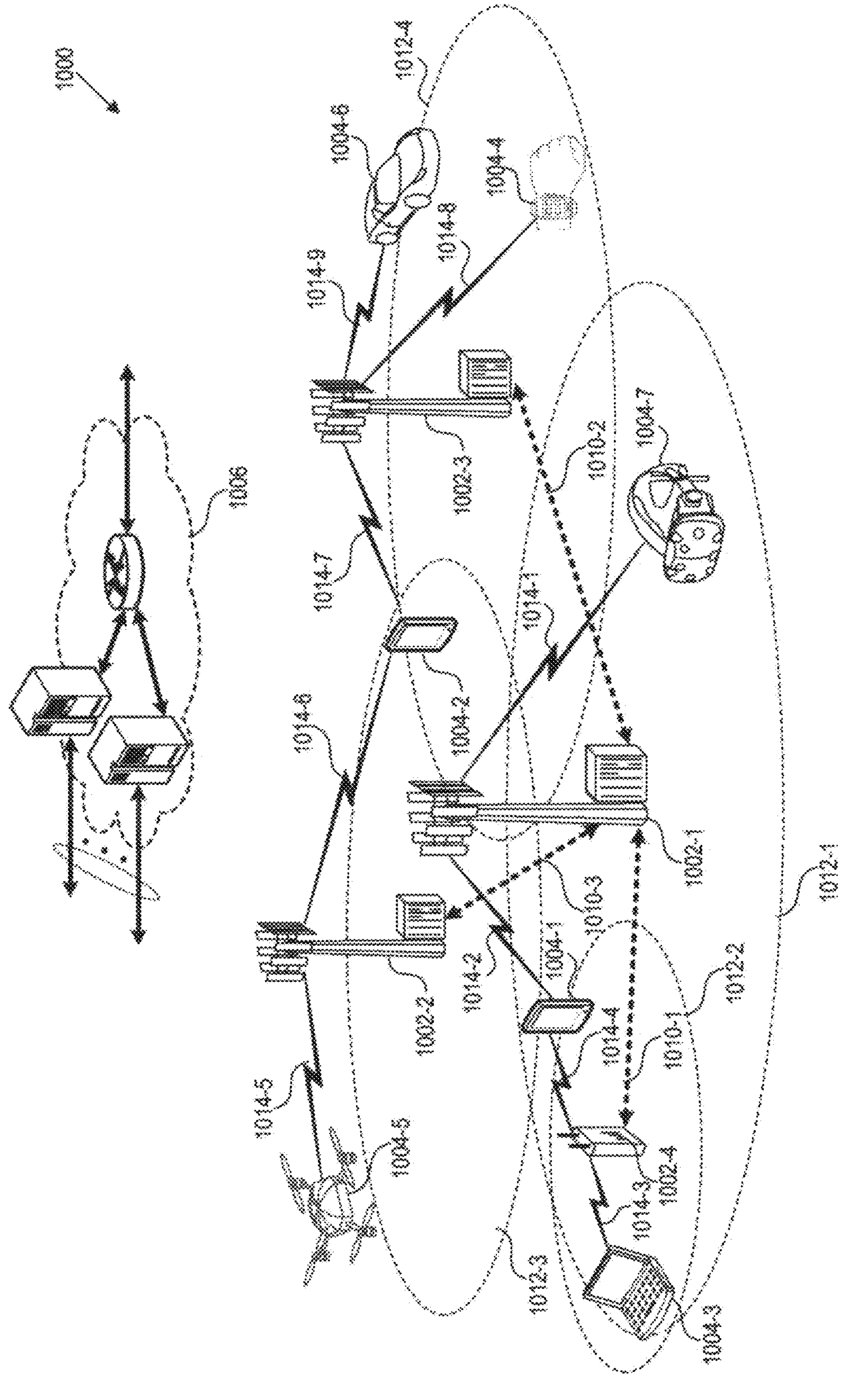
FIG. 10 is a diagram that illustrates a wireless telecommunication network in which aspects of the disclosed technology are incorporated.

FIG. 10 is a diagram that illustrates a wireless telecommunication network 1000 ("network 1000") in which aspects of the disclosed technology are incorporated. The network 1000 includes base stations 1002-1 through 1002-4 (also referred to individually as "base station 1002" or collectively as "base stations 1002"). A base station is a type of network access node (NAN) that can also be referred to as a cell site, a base transceiver station, or a radio base station. The network 1000 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 1000 formed by the network 1000 also include wireless devices 1004-1 through 1004-7 (referred to individually as "wireless device 1004" or collectively as "wireless devices 1004") and a core network 1006. The wireless devices 1004-1 through 1004-7 can correspond to or include network 1000 entities capable of communication using various connectivity standards. For example, a 5G communication channel can use millimeter wave (mmW) access frequencies of 28 GHz or more. In some implementations, the wireless device 1004 can operatively couple to a base station 1002 over a long-term evolution/long-term evolution-advanced (LTE/LTE-A) communication channel, which is referred to as a 4G communication channel.

The core network 1006 provides, manages, and controls security services, user authentication, access authorization, tracking, Internet Protocol (IP) connectivity, and other access, routing, or mobility functions. The base stations 1002 interface with the core network 1006 through a first set of backhaul links (e.g., S1 interfaces) and can perform radio configuration and scheduling for communication with the wireless devices 1004 or can operate under the control of a base station controller (not shown). In some examples, the base stations 1002 can communicate with each other, either directly or indirectly (e.g., through the core network 1006), over a second set of backhaul links 1010-1 through 1010-3 (e.g., X1 interfaces), which can be wired or wireless communication links.

The base stations 1002 can wirelessly communicate with the wireless devices 1004 via one or more base station antennas. The cell sites can provide communication coverage for geographic coverage areas 1012-1 through 1012-4 (also referred to individually as "coverage area 1012" or collectively as "coverage areas 1012"). The geographic coverage area 1012 for a base station 1002 can be divided into sectors making up only a portion of the coverage area (not shown). The network 1000 can include base stations of different types (e.g., macro and/or small cell base stations). In some implementations, there can be overlapping geographic coverage areas 1012 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 1000 can include a 5G network 1000 and/or an LTE/LTE-A or other network. In an LTE/LTE-A network, the term eNB is used to describe the base stations 1002, and in 5G new radio (NR) networks, the term gNBs is used to describe the base stations 1002 that can include mmW communications. The network 1000 can thus form a heterogeneous network 1000 in which different types of base stations provide coverage for various geographic regions. For example, each base station 1002 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 1000 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 1000 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 1000 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 1004 and the base stations 1002 or core network 1006 supporting radio bearers for the user plane data. At the Physical (PHY) layer, the transport channels are mapped to physical channels.

Wireless devices can be integrated with or embedded in other devices. As illustrated, the wireless devices 1004 are distributed throughout the system 1000, where each wireless device 1004 can be stationary or mobile. For example, wireless devices can include handheld mobile devices 1004-1 and 1004-2 (e.g., smartphones, portable hotspots, tablets, etc.); laptops 1004-3; wearables 1004-4; drones 1004-5; vehicles with wireless connectivity 1004-6; head-mounted displays with wireless augmented reality/virtual reality (AR/VR) connectivity 1004-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 1004-1, 1004-2, 1004-3, 1004-4, 1004-5, 1004-6, and 1004-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 1000 equipment at the edge of a network 1000 including macro eNBs/gNBs, small cell eNBs/gNBs, relay base stations, and the like. A wireless device can also communicate with other wireless devices either within or outside the same coverage area of a base station via device-to-device (D2D) communications.

The communication links 1014-1 through 1014-9 (also referred to individually as "communication link 1014" or collectively as "communication links 1014") shown in network 1000 include uplink (UL) transmissions from a wireless device 1004 to a base station 1002, and/or downlink (DL) transmissions from a base station 1002 to a wireless device 1004. The downlink transmissions can also be called forward link transmissions while the uplink transmissions can also be called reverse link transmissions. Each communication link 1014 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 1014 can transmit bidirectional communications using frequency division duplex (FDD) (e.g., using paired spectrum resources) or Time division duplex (TDD) operation (e.g., using unpaired spectrum resources). In some implementations, the communication links 1014 include LTE and/or mmW communication links.

In some implementations of the network 1000, the base stations 1002 and/or the wireless devices 1004 include multiple antennas for employing antenna diversity schemes to improve communication quality and reliability between base stations 1002 and wireless devices 1004. Additionally or alternatively, the base stations 1002 and/or the wireless devices 1004 can employ multiple-input, multiple-output (MIMO) techniques that can take advantage of multi-path environments to transmit multiple spatial layers carrying the same or different coded data.

Computer System

Figure 11:
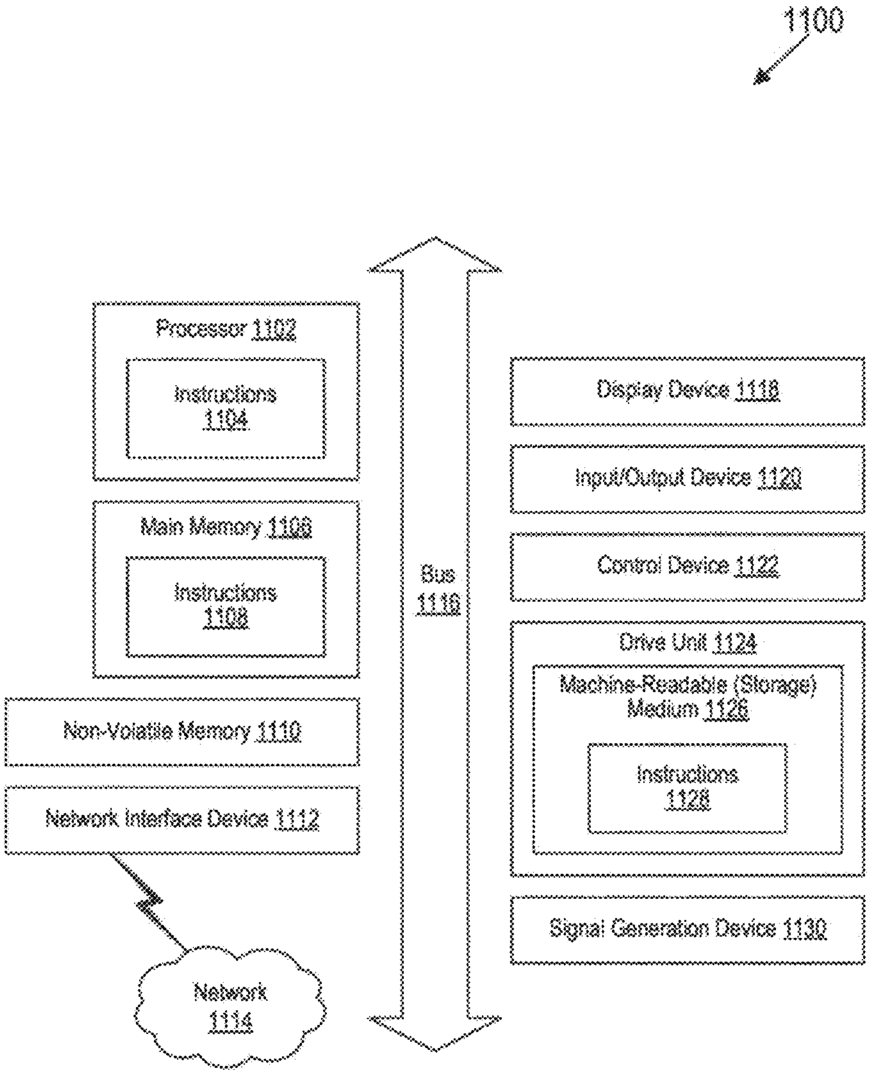
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, video display device 1118, an input/output device 1120, a control device 1122 (e.g., keyboard and pointing device), a drive unit 1124 that includes a storage medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 7 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementation, the computer system 1100 can be an embedded computer system, a system-on-chip (SOC), a single-board computer system (SBC) or a distributed system such as a mesh of computer systems or include one or more cloud components in one or more networks. Where appropriate, one or more computer systems 1100 can perform operations in real-time, near real-time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable (storage) medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

It is thus appreciated that the disclosed techniques can be implemented in the IMS to provide modularity and uniformed communication between the IMS to other network functions in the 5G or future generations of wireless communication networks, thereby allowing increased efficiency, reducing complexity in signaling, monitoring, and deployment.

REMARKS

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A method for wireless communication, comprising:

transmitting, by a Media Resource Function (MRF) node in an Internet Protocol (IP) Multimedia Subsystem (IMS), a registration request to a Network Function Repository Function (NRF) via an Nnrf interface, wherein the MRF node is capable of supporting a service-based architecture, wherein the registration request includes a profile of the MRF node, wherein the profile comprises capability information of the MRF node indicating one or more services supported by the MRF node; and receiving, by the MRF node, a registration response from the NRF acknowledging the registration request.

2. The method of claim 1, wherein the one or more services comprise at least one of a voice announcement service, a voice conferencing service, a voice codec adaptation service, a video codec adaptation service, or a video conference service.

3. The method of claim 1, wherein the registration request further comprises location information associated with media services.

4. The method of claim 1, wherein the registration request is a Nnrf_NFManagement_NFRegister request message.

5. The method of claim 1, wherein the registration response is a Nnrf_NFManagement_NFRegister response message.

6. A method for wireless communication, comprising:

transmitting, by a node capable of supporting a service-based architecture in an Internet Protocol (IP) Multimedia Subsystem (IMS), a discovery request to a Network Function Repository Function (NRF) via an Nnrf interface, wherein the discovery request includes information about one or more services; and receiving, by the node, a response from the NRF, wherein the response indicates one or more Media Resource Function (MRF) nodes that support the one or more services.

7. The method of claim 6, wherein the one or more services comprise at least one of a voice announcement service, a voice conferencing service, a voice codec adaptation service, a video codec adaptation service, or a video conference service.

8. The method of claim 6, wherein the discovery request is a Nnrf_NFDiscover_Request message.

9. The method of claim 6, wherein the response is a Nnrf_NFDiscover_Request response message.

10. A device for wireless communication implemented as a Media Resource Function (MRF) node in an Internet Protocol (IP) Multimedia Subsystem (IMS), comprising at least one processor configured to cause the device to:

transmit a registration request to a Network Function Repository Function (NRF) via an Nnrf interface, wherein the MRF node is capable of supporting a service-based architecture, wherein the registration request includes a profile of the MRF node, wherein the profile comprises capability information of the MRF node indicating one or more services supported by the MRF node;

receive a registration response from the NRF acknowledging the registration request.

11. The device of claim 10, wherein the one or more services comprise at least one of a voice announcement service, a voice conferencing service, a voice codec adaptation service, a video codec adaptation service, or a video conference service.

12. The device of claim 10, wherein the registration request further comprises location information associated with media services.

13. The device of claim 10, wherein the registration request is a Nnrf_NFManagement_NFRegister request message.

14. The device of claim 10, wherein the registration response is a Nnrf_NFManagement_NFRegister response message.

15. A node capable of supporting a service-based architecture in an Internet Protocol (IP) Multimedia Subsystem (IMS), comprising at least one processor configured to cause the node to:

transmit a discovery request to a Network Function Repository Function (NRF) via an Nnrf interface, wherein the discovery request includes information about one or more services; and receive a response from the NRF, wherein the response indicates one or more Media Resource Function (MRF) nodes that support the one or more services.

16. The node of claim 15, wherein the one or more services comprise at least one of a voice announcement service, a voice conferencing service, a voice codec adaptation service, a video codec adaptation service, or a video conference service.

17. The node of claim 15, wherein the discovery request is a Nnrf_NFDiscover_Request message.

18. The node of claim 15, wherein the response is a Nnrf NFDiscover_Request response message.

* * * * *